United States Patent [19]

Kamenetz et al.

[11] Patent Number: 4,845,617
[45] Date of Patent: Jul. 4, 1989

[54] AUTOFEATHER STATE MAINTENANCE

[75] Inventors: Jeffry K. Kamenetz, Windsor; Howard E. Simmons, Barkhamsted, both of Conn.

[73] Assignee: United Technologies Corporation, Hartford, Conn.

[21] Appl. No.: 57,069

[22] Filed: Jun. 1, 1987

[51] Int. Cl.$^4$ ............................................. G06F 15/74
[52] U.S. Cl. ..................... 364/424.04; 360/5; 371/12; 364/551.01
[58] Field of Search ............... 364/424, 900; 360/5; 371/12

[56] References Cited

U.S. PATENT DOCUMENTS

| | | | |
|---|---|---|---|
| 4,298,959 | 11/1981 | Sundermeyer et al. | 364/900 |
| 4,409,670 | 10/1983 | Herndon et al. | 364/900 |
| 4,587,655 | 5/1986 | Hirao et al. | 371/12 |
| 4,621,335 | 11/1986 | Bluish et al. | 364/550 |
| 4,646,241 | 2/1987 | Ratchford et al. | 360/5 X |
| 4,682,292 | 7/1987 | Bue et al. | 364/424 |
| 4,729,102 | 3/1988 | Miller, Jr. et al. | 364/424 |

Primary Examiner—Parshotam S. Lall
Assistant Examiner—Thomas G. Black
Attorney, Agent, or Firm—Francis J. Maguire, Jr.

[57] ABSTRACT

Each engine of a multi-engine aircraft is monitored to determine if it has become inoperative during a critical flight mode such as takeoff or landing. If so, the propeller of the inoperative engine is feathered and the remaining engine or engines is uptrimmed. A "state machine" indicative of the various states of the aircraft is established and the present state of the aircraft is stored in a non-volatile memory; if an electrical power interruption occurs during a critical flight mode the identity of the present operating state may be quickly recalled for immediate refeathering of an inoperative engine and reuptrimming of the remaining engine or engines.

8 Claims, 4 Drawing Sheets

AUTOFEATHER STATE MAINTENANCE

TECHNICAL FIELD

This invention relates to aircraft engine monitoring and, more particularly, to propeller power monitoring for enhanced control of an aircraft on takeoff, landing and other critical flight modes.

BACKGROUND ART

It is often desired to ensure that a multi-engine aircraft is able to achieve takeoff and landing with one engine in the event of one or more engine failures in those and other critical flight modes. If, for example, both engines of a twin engine turboprop aircraft are each operating on takeoff at about 90% of full rated power (a typical fuel saving measure) and one suddenly "dies," control is enhanced by automatically feathering the dead engine and uptrimming the good engine. The feathering might save, for example, approximately 15% drag on the good aircraft and the uptrim, by providing more fuel to the engine, might provide approximately 10% more power for a total effect of approximately 25% more power.

If, however, during takeoff there is a single engine failure followed by a temporary electrical failure, the command to feather the dead engine and uptrim the good engine is lost. Upon return of electrical power, the feather and uptrim conditions are not continued. As a result, the loss of feather would increase the drag by approximately 15% and the loss of uptrim would reduce thrust by approximately 10%.

DISCLOSURE OF THE INVENTION

The object of the present invention is to enhance control during takeoff and landing for multi-engine aircraft.

According to the present invention, each engine of a multi-engine aircraft is monitored by means of one or more sensors corresponding to parameters indicative of the aircraft's condition. The aircraft itself or other parameters for controlling the aircraft or engine may also be monitored. The identity of the present state of each engine's autofeathering system is determined according to state criteria defined according to the magnitude of one or more parameter signals taken from the sensors. A signal indicative of the identity of the present state of each engine autofeather system is stored in a nonvolatile memory and is retrieved from the nonvolatile memory for controlling the aircraft's propeller according to that identified present state. If the identified state indicates that an engine is inoperative, then action must be taken to feather the inoperative engine and uptrim the remaining good engine or engines.

Depending on the algorithm selected, the electrical power to the aircraft control unit may also be continually or repeatedly checked for integrity and, upon detection of a power interruption, the nonvolatilely stored signal (indicative of the identity of the last engine autofeather system state before the interruption) is retrieved just after restoration of power. The retrieved signal is provided for immediate use in controlling the aircraft propeller according to the last engine state, as identified by the retrieved signal.

Thus suppose, for example, that a twin engine turboprop aircraft takes off with both engines operative and, while still in the takeoff mode, loses one engine. A signal processor will store the identity of the feather state in a nonvolatile memory and the aircraft control will feather the inoperative engine and uptrim the remaining good engine. Now suppose further that immediately thereafter, while still in the takeoff mode, the aircraft experiences an electrical power interruption or "glitch" of indefinite duration. According to the present invention, the feather state which led to the feather and uptrim commands is automatically retrieved from the nonvolatile memory and the feather and uptrim commands are not lost upon the return of electrical power.

The benefits of the present invention include providing added flight control by storing the autofeather state during critical flight modes, removing the need for battery backup or power interrupt immune power supplies within the control, reducing the cost, size, weight, development time and power needs of the control, and reducing pilot workload by not requiring the pilot to reiterate the feather and uptrim command actions.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
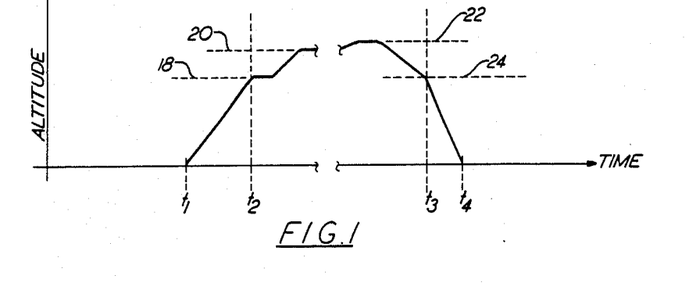
FIG. 1 is an illustration of a typical flight profile for a multi-engine aircraft.

FIG. 1 is an illustration of a typical flight profile for a multi-engine aircraft in which the present invention may be usefully applied. An aircraft taxies until reaching a takeoff point at time $t_1$ after which the altitude rises steeply to a point at time $t_2$ where the aircraft levels off at an altitude 18 for a brief period, after which altitude is again increased to a level 20. The flight profile is shown with broken lines after this point to indicate that the aircraft would normally stay aloft at or near this flight level for an extended period of time. Near the end of the high altitude part of the flight, at which point the aircraft is flying, e.g., at a level 22, the altitude is rapidly decreased to a level 24 at time $t_3$ at which point the aircraft begins its final descent. The flight is terminated at a point in time $t_4$ at which point the aircraft is back on the ground again and taxiing.

During the period of time between $t_1$ and $t_2$, i.e., during takeoff, and during the period of time from $t_3$ to $t_4$, i.e., during the final descent period of the flight, it is sometimes desirable to be able to enhance smooth takeoff or landing in the event of failure of an engine in a multi-engine aircraft. To attain this, certain conditions enhance flight performance. For example, upon local engine failure, it is desirable to automatically "feather"

the local propeller and "uptrim" the remote engine. "Feather" means to align the propeller pitch to point straight ahead to decrease the drag of the failed engine's propeller on the rest of the aircraft and "uptrim" means to increase the flow of fuel to the remaining operative engine or engines to increase their power output e.g., to full rated power.

If, during a critical flight mode such as takeoff or descent an engine fails and, subsequent to the engine failure (i.e., during which the failed engine is controlled in a feather condition and the remaining good engine or engines are controlled in an "uptrim" condition), there is a temporary electrical failure, the feather command to the failed engine and the uptrim command to the remaining good engine or engines is lost. Upon return of electrical power, it would be most undesirable for these signals to be lost. The loss of the feather command would increase the drag by, for example, approximately 15% and the loss of uptrim would reduce thrust by, for example, approximately 10% in a twin engine turboprop aircraft.

Figure 2:
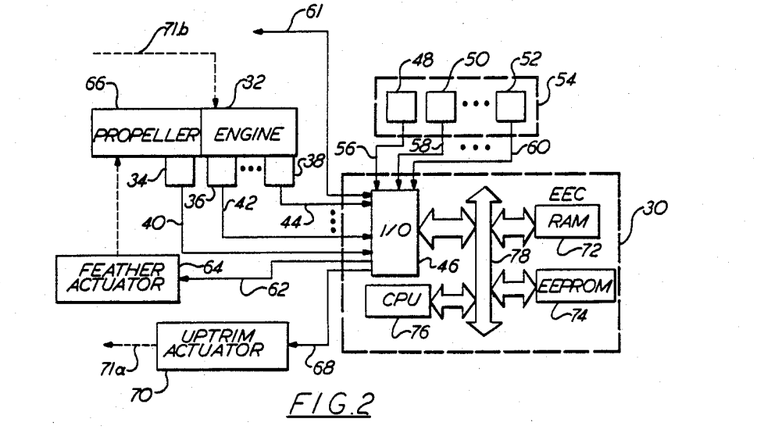
FIG. 2 is an illustration of engine monitor and control for a multi-engine aircraft, according to the present invention.

FIG. 2 provides an illustration of a signal processor 30, according to the present invention, which monitors an aircraft, including at least one engine 32 in a multi-engine aircraft. The processor may be used to monitor the other engines as well, or they may have their own dedicated processors. The signal processor is responsive to a number of engine sensors 34, 36, . . . 38 which provide a corresponding number of sensed signals on lines 40, 42, . . . 44 to an input/output (I/O) port 46 of the signal processor 30 of FIG. 2 is also responsive to a number of other sensors in the aircraft 48, 50, . . . 52 generally indicative of engine, command, reference, or diagnostic signal levels provided on a corresponding set of signal lines 56, 58, . . . 60 to the input/output port 46. The sensors not strictly related to actually monitoring the local engine 32 are grouped in a group 54 for the purposes of discussion. The signal processor is also responsive to and provides control signals such as interrupts, handshaking, etc., on a line 61.

Figure 3:
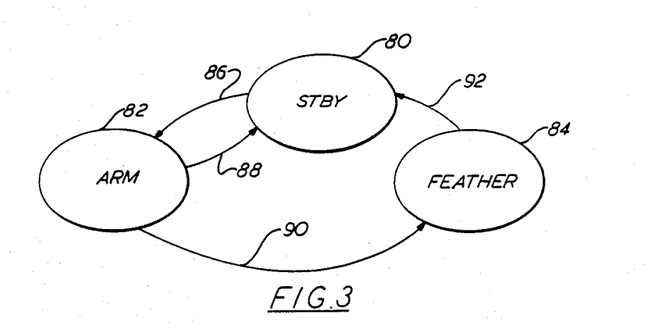
FIG. 3 is an illustration of a state diagram utilized for an embodiment of the present invention.
Figure 4:
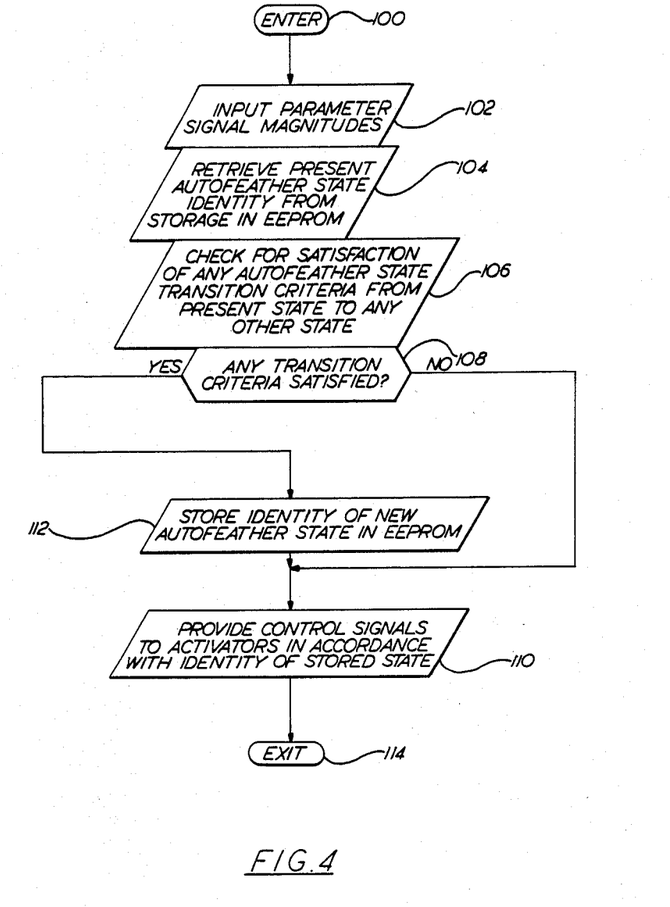
FIGS. 4, 5 and 6 are a simplified flow chart illustrations of three alternative sets of logical steps which may be executed by a signal processor, such as is illustrated in FIG. 2, for carrying out the monitoring, for example, of the states illustrated in FIG. 3 and for storing the identity of such states, as they occur, in nonvolatile memory.
Figure 5:
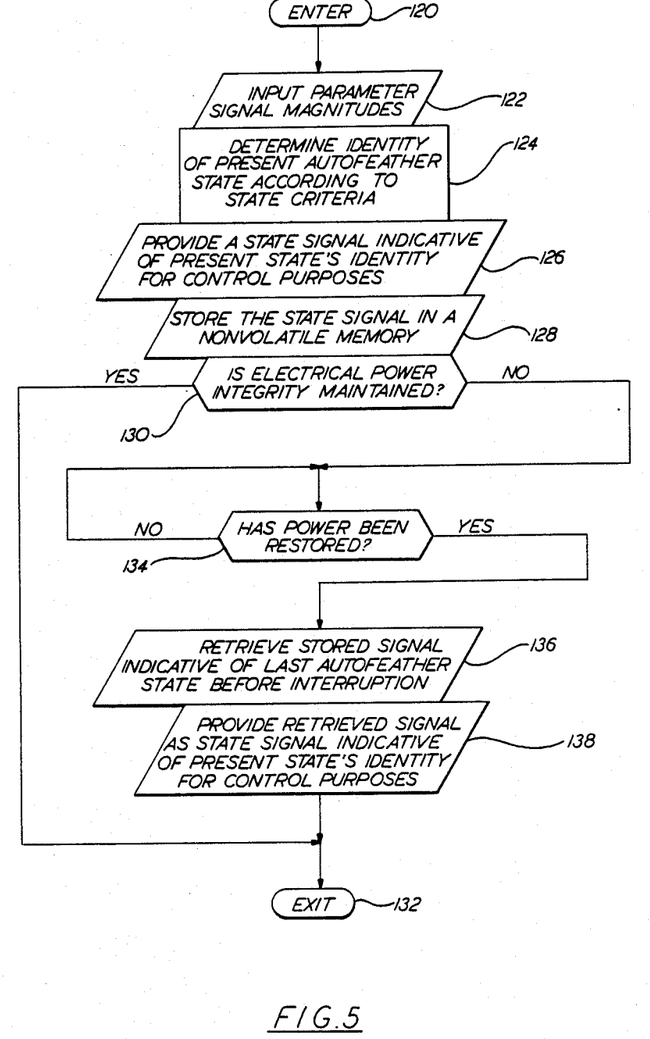
Figure 6:
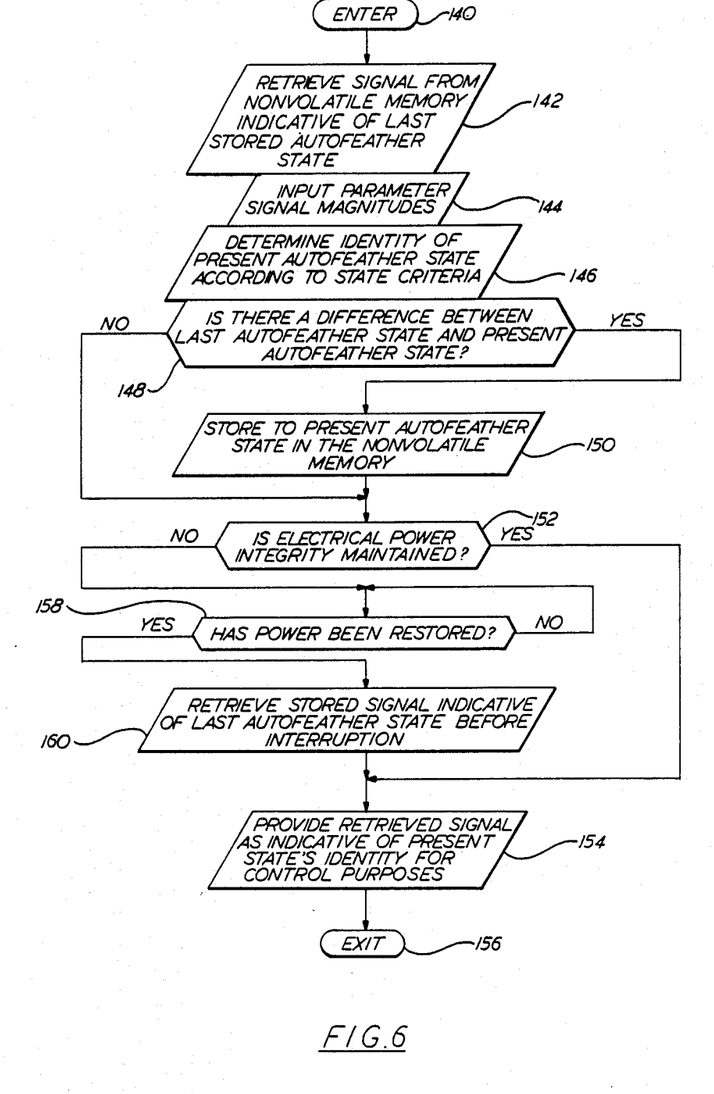

The signal processor 30 of FIG. 2 generally executes a number of logical steps, such as are illustrated without limitation in FIGS. 4, 5 and 6 for maintaining a state machine such as is illustrated without limitation in FIG. 3. Depending on which state the signal processor determines that the engine is presently in, will determine whether or not a feather command signal is provided on a line 62 to a feather actuator 64 for feathering a propeller 66 driven by the monitored engine 32 and for determining whether or not an uptrim command signal on a line 68 is provided to an uptrim actuator 70 for uptrimming, as shown by a line 71a, the one or more remaining good engines. Conversely, engine 32 may also be uptrimmed, via a similar line 71b, in response to another engine going "dead."

The signal processor 30 may comprise part of an electronic engine control (EEC) commonly utilized for aircraft engine controllers. The signal processor may include a random access memory (RAM) 72, a nonvolatile memory 74 such as an electrically erasable programmable read only memory (EEPROM) or an electrically alterable read only memory (EAROM), a central processing unit 76 (CPU) and the I/O unit 46, all communicating with one another via a bus 78 which may include instructions, data, addressing, and control signal functions. A number of the set of sensors 48, 50, . . . 52 previously described may be related to one another, for example, in a subgroup of group 54 relating to cockpit commands such as power lever position. And, others may relate to the other engine or engines or to diagnostic information from other signal processors in the aircraft relating to engine conditions. The feather actuator 64 would normally be part of a propeller control unit (PCU) system for the monitored engine 32 and the uptrim actuator would normally be related to another electronic engine control (EEC) or to a fuel control unit (FCU) for another engine or engines in the aircraft.

It should be understood that the signal processor 30 of FIG. 2 is merely illustrative of one of many forms in which the inventive concepts as taught herein may be embodied. Thus, although the signal processor 30 of FIG. 2 is shown as a dedicated general purpose digital signal processor, it will be understood that the inventive concepts could be carrie out in a nondedicated processor, in a discrete hardwired special purpose digital computer designed specifically for the task or in an equivalent analog circuit. Furthermore, although the signal processor 30 has been shown as being responsive to a number of sensors relating to the aircraft, the monitored engine, the cockpit commands and other engine diagnostics, it will be understood that the state machine concept illustrated in FIG. 3 and the logical steps executed as illustrated in FIGS. 4, 5 or 6 for establishing such a state machine may be accomplished by another state diagram, similar in concept to that of FIG. 3, or by monitoring parameters other than those specifically identified herein. In other words, only a single embodiment of the invention at a certain level of elaboration has been shown but the details thereof should in no way be held to be a limitation on the scope of the claims herein.

FIG. 3 is an illustration of a state machine, according to the present invention. Three states, standby 80, arm 82, and feather 84 are illustrated in FIG. 3 but it should be understood, for reasons that will become apparent, that only two states could have been illustrated, by merging the standby state 80 with the arm state 82. The feather state 84 would stay the same.

The standby state 80 corresponds to the period of time while taxiing before takeoff and after landing, i.e., corresponding to the time before time $t_1$ and after time $t_4$ in FIG. 1, and also during the period between times $t_2$ and $t_3$. These are noncritical flight modes in which it is unnecessary to burden the signal processor 30 with the autofeather state maintenance task, according to the invention, where it can be profitably engaged in other activities.

Each of the states 80, 82, 84 illustrated in FIG. 3 may be transitioned to or from upon the satisfaction of transition criteria. Satisfaction of a transition criterion would normally be indicated by a change in a selected one or more of the monitored signals of FIG. 2. For the example of FIG. 3, a transition from the standby state 80 to the arm state 82 is indicated by a transition line 86 which may be satisfied by, for example, the sensor 48 of FIG. 2 sensing, for example, that a cockpit power command lever relating to a desired power level is in a defined "window", a similar power lever sensor 50 relating to the remaining engine in a twin engine aircraft is similarly in a defined "window," a takeoff or descent mode has been selected as indicated by the signal line 60 as sensed by a mode sensor 52, the local engine is producing greater than, e.g., 50% or some other threshold torque as indicated by the magnitude of a torque signal on the line 42 as sensed by a torque sensor 36, the output torque of the other engine is similarly greater than 50% as indicated by a similar torque sensor signal from the other engine (not shown in FIG. 2 but generally from within the group of sensor 54). Additional criteria might be provided by a sensor similar to the sensor 34 of FIG. 2 but relating to the other engine and providing a signal similar to the signal on the line 40 but from within the group of sensors 54 from the other engine indicative of whether or not the other engine's propeller is or is not in the feathered state (to prevent the engine 32 from being put into the feathered state if the other engine is already in that state), and any other desired diagnostics which a designer might wish to include in the definition of the transition criterion generally indicated by the transition line 86 of FIG. 3. As previously indicated, the selected criterion may be as simple or as complex as desired, according to the present invention.

When in the arm state 82, one is generally in a critical flight mode, for example, as indicated between the times $t_1$ and $t_2$ and between the times $t_3$ and $t_4$ of FIG. 1. When in the standby state 80, one is generally in a noncritical flight mode, such as taxi or between times $t_2$ and $t_3$ of FIG. 1. A difference between these two states may be, in some cases, that the logical steps illustrated in FIGS. 4, 5 or 6 would be entered for complete execution more frequently in the arm state 82 than in the standby state 80. This might serve the purpose of relieving the signal processor 30 for other tasks when such monitoring would be unnecessary in noncritical flight modes.

Once in the arm state 82, one may transition via a transition line 88 back to the standby state 80 or to the feather state 84 via a transition line 90.

A transition from the arm state back to the standby state would occur, for example, if either power lever is removed from the "window" or if both engines lose torque, or if a remote engine's propeller goes into the feather condition, or if the diagnostics disallow the arm state, or for a final example, if the aircraft is not in the takeoff or descent mode. Each of these states would be determined from individual sensors or combinations of sensors as described previously.

A transition from the arm state 82 to the feather state 84, as indicated by the transition line 90, would occur, for example, if the two power levers are in the proper window, the remote engine is putting out greater than approximately 50% torque, the local engine is putting out less than approximately 25% torque, the aircraft is in the takeoff or descent mode, proper diagnostics exist, etc. Any of these signals, and others, taken alone or in combination may be selected by the designer for specifying a transition criterion from the arm state to the feather state.

Once in the feather state 84 the signal processor 30 of FIG. 2 will take appropriate steps to command the local engine propeller 66 to assume the feather condition as indicated by a feather command on the signal line 62 and will also take the necessary steps to uptrim the remote engine (not shown) as indicated by an uptrim command signal on the line 68.

Once in the feather state 84 a transition may be made back to the standby state 80 as indicated by a transition line 92 if, for example, both power levers have been removed from the selected "window" as indicated by appropriate sensors within the group 54 of FIG. 2.

Referring now to FIG. 4, an illustration is there provided of a simplified flow chart, illustrating a series of logical steps which may be carried out by the signal processor 30 of FIG. 2 in establishing a state machine such as is shown in FIG. 3, capable of carrying out the objects of the present invention. It will of course be understood that the characterization of FIG. 3 as a "state machine" is not the same as implying the states shown have physical counterparts. The "state machine" of FIG. 3 itself is merely a conceptual mode used by the designer to establish the conditions which will trigger the desired control actions at the proper time. On the other hand, however, the signal processor of FIG. 2, once programmed according to the logical steps of FIG. 4, which were in turn designed using the state diagram of FIG. 3, is such a "state" machine. The same comments apply to the alternative flow charts of FIGS. 5 and 6.

Referring back to FIG. 4, after entering at a step 100, a step 102 is next executed in which the input signals 40, 42, . . . 44, and 56, 58, . . . 60 of FIG. 2 are sampled to determine their present magnitudes. They may be stored, for example, in the RAM 72 of the EEC unit 30. The present engine state identity is retrieved from storage in non-volatile memory, for example, the EEPROM 74. It is assumed, at least for the moment, that the last storage location written to in EEPROM still corresponds to the "present" state of the engine.

Once the identity of the "present" engine autofeather system state is determined in step 104, a step 106 is next executed in which each of the possible transition criteria defining transitions from the "present" state to another state are checked. If none are satisfied, as determined in a step 108, a step 110 is next executed in which control signals, e.g., on lines 62, 68 of FIG. 2 will be provided to the appropriate actuators at the same magnitudes as in the previous run through the routine, i.e., with no change, since the state has not changed.

On the other hand, if it is determined in step 108 that a state transition criterion has been satisfied, a step 112 is executed before executing step 110 in which the identity of the new engine autofeather system state is stored in the EEPROM 74. Furthermore, the control signals provided in step 110, which is next executed, may be different from what they otherwise would have been if no transition criteria had been satisfied. This would of course be true if the transition was from the arm state to the feather state or from the feather state to the standby state.

After executing step 110, a step 114 is next executed in which an exit is made.

FIG. 5 is an alternative flow chart illustration of a series of logical steps which may be carried out by the signal processor 30 of FIG. 2 in establishing a state machine capable of carrying out the objects of the present invention. After entering at a step 120, a step 122 is next executed in which the input signals 40, 42, . . . 44, and 56, 58, . . . 60 of FIG. 2 are sampled to determine their present magnitudes. They may be stored, for example, in the RAM 72 of the EEC unit 30. The present engine autofeather system state is then determined in a step 124 according to state criteria defined according to various combinations of the input parameter signal magnitudes. A signal indicative of the present state's identity is provided in a step 126 for controlling the aircraft. For example, if the identity of the present engine autofeather system state is determined to be nonoperative then the state signal will indicate that the engine is "dead" and appropriate control actions will be taken by the aircraft to feather the "dead" engine and uptrim the remaining engine or engines.

The state signal is then stored in a step 128 in a nonvolatile memory. A decision step 130 then determines whether electrical power integrity has been or is presently being maintained. If so, an exit is made in a step 132. If not, a step 134 is next executed in which a determination is made as to whether or not power integrity has been restored after the interruption detected in step 130. If not, step 134 is reexecuted until it has been restored. If power has been restored, a step 136 is next executed in which a signal stored in nonvolatile memory, indicative of the last engine autofeather system state before the power interruption, is retrieved. The retrieved signal is provided in a step 138 as a state signal indicative of the present engine autofeather system state for controlling the aircraft, as described before. An exit is then made in step 132.

FIG. 6 is still another alternative flow chart diagram illustrating a series of logical steps which may be carried out by the signal processor 30 of FIG. 2 in establishing a state machine capable of carrying out the objects of the present invention. It will be understood that any number of other flow charts accomplishing the same objects of the present invention may be constructed by rearranging, adding or deleting steps by those skilled in the art. Therefore, the broadest claims of the present invention should in no way be interpreted in the narrow sense disclosed by these various flow charts.

After entering at a step 140, a step 142 is next executed in which a signal is retrieved from nonvolatile memory indicative of the last stored engine autofeather system state. The input signals 40, 41, . . . 44 and 56, 58, . . . 60 of FIG. 2 are then sampled in a step 144 to determine their present magnitudes. The identity of the present engine autofeather system state is determined in a step 146 according to state criteria previously established.

A comparison between the identity of the present engine autofeather system state and the identity of the retrieved engine state is made in a step 148 and if a difference is found, the present engine autofeather system state is stored in the nonvolatile signal storage medium in step 150. If no difference was found, or after storing the present engine autofeather system state in step 150, a step 152 is next executed in which a determination is made as to whether or not electrical power integrity has been or is presently maintained. If so, a step 154 is next executed in which the retrieved signal is provided as indicative of the present engine autofeather system state's identity for controlling the aircraft, as described before in connection with the other flow charts. An exit is then made in a step 156.

If a determination was made in step 152 that the electrical power integrity was not maintained, a step 158 is next executed in which a determination is made as to whether or not power integrity has been restored. If not, step 158 is reexecuted until it has. Upon determining that integrity has been restored, a step 160 is next executed in which a stored signal indicative of the last state before the interruption is retrieved. It is this signal that will be provided in the next step to be executed, step 154, as indicative of the present state's identity for controlling the aircraft. An exit is then made in step 156.

With regard to the method and means of actually storing the state signal information in the non-volatile memory, the disclosure of U.S. Pat. No. 4,638,430 provides an illustrative method suitable, without limitation, for the present invention and it is hereby incorporated by reference.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A method of controlling an aircraft, comprising the steps of:

monitoring one or more parameter signals indicative of one or more corresponding parameters relating to said aircraft;

identifying a present state of said aircraft according to predefined state criteria defined by the magnitudes of one or more of said monitored parameter signals, said present state being one of a plurality of predefined operating states of said aircraft;

storing said present state signal in a nonvolatile storage medium;

providing one or more control signals for said aircraft at least partially in response to said present state signal; and checking for the presence of electrical power, and, upon detection of a restoration of electrical power after an interruption, retrieving said stored present state signal from said nonvolatile storage medium and providing one or more control signals to said aircraft at least partially in response to said retrieved present state signal.

2. The method of claim 1, wherein said nonvolatile storage medium comprises electrically erasable programmable read only memory.

3. A method of controlling an aircraft, comprising the steps of:

retrieving a signal from a nonvolatile storage medium, said retrieved signal being indicative of a last state of said aircraft, said last state being one of a plurality of predefined operating states of said aircraft;

monitoring one or more parameter signals indicative of one or more corresponding parameters relating to said aircraft;

identifying a present state of said aircraft according to predefined state criteria defined by the magnitudes of one or more of said monitored parameter signals;

providing a signal indicative of said present state;

comparing said last state signal to said present state signal to determine whether a difference exists therebetween, and, upon determination of such a difference, storing said present state signal in said nonvolatile storage medium whereby said stored present state signal is indicative of the last state of said aircraft; and checking for the presence of electrical power, and, upon detection of a restoration of electrical power after an interruption, retrieving said stored present state signal indicative of the last state of said aircraft from said nonvolatile storage medium and providing one or more control signals to said aircraft at least partially in response thereto.

4. The method of claim 3, wherein said nonvolatile storage medium comprises electrically erasable programmable read only memory.

5. Apparatus for controlling an aircraft, comprising:

sensor means for sensing the magnitudes of one or more aircraft parameters, and for providing sensed signals indicative of the current magnitudes thereof;

nonvolatile storage means for storing signal indicative of a plurality of predefined operating states of said aircraft; and signal processing means, responsive to said sensed parameter signals, for providing a signal indicative of a present state of said aircraft, said present state signal defined according to predefined state criteria defined by the magnitudes of one or more of said sensed parameter signals, for storing said present state signal in said nonvolatile storage means, for providing one or more control signals to said aircraft at least partially in response to said present state signal, and for checking for the presence of electrical power, and, upon detection of a restoration of electrical power after an interruption, for retrieving said stored present state signal from said nonvolatile storage medium and for providing one or more control signals to said aircraft at least partially in response to said retrieved present state signal.

6. The apparatus of claim 5, wherein said nonvolatile storage means comprises electrically erasable programmable read only memory.

7. Apparatus for controlling an aircraft, comprising:
sensor means for sensing the magnitudes of one or more aircraft parameters, and for providing sensed signals indicative of the current magnitudes thereof;

nonvolatile storage means for storing signals indicative of a plurality of predefined operating states of said aircraft; and signal processing means, responsive to said sensor means, for retrieving a signal from said nonvolatile storage means indicative of a least state of said aircraft, for providing a signal indicative of a present state of said aircraft, said present state signal defined according to predefined state criteria defined by the magnitudes of one or more of said sensed parameter signals, for comparing said last state signal to said present state signal to determine whether a difference exists therebetween, and, upon the determination of such a difference, for storing said present state signal in said nonvolatile storage means whereby said stored present state signal is indicative of the last state of said aircraft, and for checking for the presence of electrical power, and, upon detection of a restoration of electrical power after an interruption, for retrieving said stored last state signal from said nonvolatile storage medium and for providing one or more control signals to said aircraft at least partially in response to said retrieved last state signal.

8. The apparatus of claim 7, wherein said nonvolatile storage means comprises electrically erasable programmable read only memory.

* * * * *

UNITED STATES PATENT AND TRADEMARK OFFICE
CERTIFICATE OF CORRECTION

PATENT NO. : 4,845,617

DATED : July 4, 1989

INVENTOR(S) : Jeffry K. Kamenetz and Howard E. Simmons

It is certified that error appears in the above-identified patent and that said Letters Patent is hereby corrected as shown below:

Column 4, line 17, "carrie" should read --carried-

Claim 7, column 10, line 8 "least" should read --last--

Signed and Sealed this

Twenty-first Day of May, 1991

Attest:

HARRY F. MANBECK, JR.

Attesting Officer

Commissioner of Patents and Trademarks